(12) United States Patent
Smith et al.

(10) Patent No.: US 9,535,815 B2
(45) Date of Patent: Jan. 3, 2017

(54) SYSTEM, METHOD, AND COMPUTER PROGRAM PRODUCT FOR COLLECTING EXECUTION STATISTICS FOR GRAPHICS PROCESSING UNIT WORKLOADS

(71) Applicant: NVIDIA Corporation, Santa Clara, CA (US)

(72) Inventors: Gregory Paul Smith, Leander, TX (US); Lars Siegfried Nyland, Carrboro, NC (US)

(73) Assignee: NVIDIA Corporation, Santa Clara, CA (US)

( * ) Notice: Subject to any disclaimer, the term of this patent is extended or adjusted under 35 U.S.C. 154(b) by 139 days.

(21) Appl. No.: 14/296,311

(22) Filed: Jun. 4, 2014

(65) Prior Publication Data

US 2015/0355996 A1     Dec. 10, 2015

(51) Int. Cl.
*G06F 9/44* (2006.01)
*G06F 11/36* (2006.01)
*G06F 9/46* (2006.01)
*G06F 9/50* (2006.01)

(52) U.S. Cl.
CPC ........... *G06F 11/3636* (2013.01); *G06F 9/461* (2013.01); *G06F 9/5016* (2013.01)

(58) Field of Classification Search
CPC .............. G06F 11/3466; G06F 11/3636; G06F 2201/86; G06F 11/3471; G06F 11/3612; G06F 11/3676; G06F 2201/865
See application file for complete search history.

(56) References Cited

U.S. PATENT DOCUMENTS

| | | | | |
|---|---|---|---|---|
| 6,353,924 B1* | 3/2002 | Ayers | ................... | G06F 11/3466 714/E11.2 |
| 7,478,371 B1* | 1/2009 | Gove | ................... | G06F 11/3461 717/128 |
| 8,006,232 B1* | 8/2011 | Rideout | ................ | G06F 11/362 709/217 |
| 2002/0174421 A1* | 11/2002 | Zhao | ....................... | H04L 67/02 717/174 |
| 2003/0046610 A1* | 3/2003 | Yamamoto et al. | ............ | 714/34 |
| 2004/0216097 A1* | 10/2004 | Sun | ........................ | G06F 12/121 717/154 |
| 2008/0256339 A1* | 10/2008 | Xu et al. | ....................... | 712/216 |

(Continued)

OTHER PUBLICATIONS

Yosefk; Parallelism in NVIDIA GPUs; 2011 Yosefk; 33 pages; <http://yosefk.com/blog/simd-simt-smt-parallelism-in-nvidia-gpus.html>.*

(Continued)

*Primary Examiner* — Thuy Dao
*Assistant Examiner* — Cuong V Luu
(74) *Attorney, Agent, or Firm* — Zilka-Kotab, PC (57) ABSTRACT

A system, method, and computer program product are provided for collecting trace information based on a computational workload. The method includes the steps of compiling source code to generate a program, launching a workload to be executed by the parallel processing unit, collecting one or more records of trace information associated with a plurality of threads configured to execute the program, and correlating the one or more records to one or more corresponding instructions included in the source code. Each record in the one or more records includes at least a value of a program counter and a scheduler state of the thread.

19 Claims, 8 Drawing Sheets

(56) References Cited

U.S. PATENT DOCUMENTS

| | | | | |
|---|---|---|---|---|
| 2010/0107142 A1* | 4/2010 | Chilimbi | ............ | G06F 11/3447 717/128 |
| 2011/0219376 A1* | 9/2011 | Williams | ............ | G06F 11/3466 718/100 |
| 2013/0238938 A1* | 9/2013 | Baliga et al. | ................ | 714/38.1 |
| 2014/0310679 A1* | 10/2014 | Bhattacharya | ........ | G06F 11/362 717/102 |

OTHER PUBLICATIONS

Steffen Frey et al.; SIMT Microscheduling Reducing Thread Stalling in Divergent Iterative Algorithms; 2012 IEEE; pp. 399-406; <http://ieeexplore.ieee.org/stamp/stamp.jsp?tp=&arnumber=6169578>.*

Luke Yen et al.; LogTM-SE Decoupling Hardware Transactional Memory from Caches; 2007 IEEE; pp. 261-272; <http://ieeexplore.ieee.org/stamp/stamp.jsp?tp=&arnumber=4147667>.*

Mark D. Hill et al.; A Case for Deconstructing Hardware Transactional Memory Systems; 2008 Dagstuhl; 8 pages; <http://drops.dagstuhl.de/opus/volltexte/2008/1375/>.*

Clemens Kolbitsch et al.; The Power of Procrastination Detection and Mitigation of Execution-Stalling Malicious Code; 2011 ACM; pp. 285-296; <http://dl.acm.org/citation.cfm?id=2046740>.*

Craig B. Zilles et al.; The Use of Multithreading for Exception Handling; 1999 IEEE; pp. 219-229; <http://dl.acm.org/citation.cfm?id=320114>.*

Kim Hazelwood et al.; Scalable Support for Multithreaded Applications on Dynamic Binary Instrumentation Systems; 2009 ACM; pp. 20-29; <http://dl.acm.org/citation.cfm?id=1542435>.*

Berger, A. S., "Embedded Systems Design: An Introduction to Processes, Tools, and Techniques," CMP Books, 2002, pp. 1-209.

Dean, J. et al., "ProfileMe: Hardware Support for Instruction-Level Profiling on Out-of-Order Processors," Proceedings of Micro-30, Dec. 1-3, 1997, pp. iii-vi and 1-12.

Dees, R., "Nexus Revealed: An Introduction to the IEEE-ISTO 5001 Nexus Debug Standard," Preview Edition, 2012, pp. 1-14.

Intel, "Intel 64 and IA-32 Architectures Software Developer's Manual," vol. 3 (3A, 3B &3C), Chapter 18 and 19, Feb. 2014, pp. 18/1-19/198.

ARM, The Architecture for the Digital World, ARM Ltd., Feb. 2014, retrieved from http://www.arm.com/index.php.

"ARM System Trace Macrocell: Programmers Model Architecture Specification Version 1.1," ARM, 2013, pp. 1-88.

"Embedded Trace Macrocell: ETMv1.0 to ETMv3.5," Architecture Specification, ARM, 2011, pp. 1-420.

"ARM CoreSight Architecture Specification," ARM, Version 2.0, 2013, pp. 1-182.

* cited by examiner

SYSTEM, METHOD, AND COMPUTER PROGRAM PRODUCT FOR COLLECTING EXECUTION STATISTICS FOR GRAPHICS PROCESSING UNIT WORKLOADS

FIELD OF THE INVENTION

The present invention relates to software debugging, and more particularly to mechanisms for capturing execution statistics for a plurality of threads executed by a graphics processing unit.

BACKGROUND

Programmers use various debugging tools to analyze the source code that they generate in order to create more efficient programs. A plethora of debugging tools are available that enable programmers to analyze their programs. Some techniques include the utilization of trace tools to collect information about events generated by an application, operating system, driver, or hardware. Many processors enable such trace information to be collected. Trace information can be collected where the current program counter value for the active thread is sampled at periodic intervals such as every 10,000 cycles or when an event counter reaches a particular value (e.g., after every 100 cache misses, after 50 branch calls, etc.). Such collection methods may be enabled by hardware implemented within the processor such as the Performance Monitor included in the Intel® x86 family of CPUs or the ETM (Embedded Trace Macrocell) in some ARM® processors. In another instance, the application can be instrumented to collect such information (i.e., the driver may add instructions to the source code to collect call count and timing information for functions or basic blocks).

The techniques described above have been implemented in various microprocessors, but these techniques have their drawbacks. The embedded trace tools typically only collect information about the active threads (i.e., the one or two threads in a particular processor core that are issued during the current clock cycle). This may work for microprocessor architectures that only have a few active threads running at once, but this technique fails to collect information about the hundreds or thousands of stalled threads during any given clock cycle in today's graphics processing architectures. Similarly, instrumenting the application source code has its drawbacks as well. Tools may be used to modify already compiled binary code or software programmers may add explicit instrumenting instructions in the source code. Instrumenting the application in this manner may impact code generation, increase the size of the compiled program, and/or decrease performance of the code, therefore leading to different results than if the code were executed without such instrumentation.

Conventional parallel processing unit architectures do not include sufficient hardware infrastructure to collect trace information for the sheer number of threads being processed by the processing unit per clock cycle. For example, up to 120 instructions per cycle may be issued on many of today's GPUs, requiring a huge amount of memory bandwidth to transmit this data to a memory for analysis. The parallel processing unit architectures are also not optimized to handle interrupts without interfering with the performance of the program. Similarly, software instrumentation tends to also interfere with the operation of the program, thus skewing results compared with the execution of the program without instrumentation. Thus, there is a need for addressing these issues and/or other issues associated with the prior art.

SUMMARY

A system, method, and computer program product are provided for collecting trace information based on a graphics processing unit workload. The method includes the steps of compiling source code to generate a program, transmitting the program to a parallel processing unit, launching a workload to be executed by the parallel processing unit, collecting one or more records of trace information associated with a plurality of threads configured to execute the program, and correlating the one or more records to one or more corresponding instructions included in the source code. Each record in the one or more records includes at least an address of a program counter and a scheduler state of the thread.

DETAILED DESCRIPTION

Conventional microprocessors such as the Intel® x86 microprocessors or the ARM® RISC-based microprocessors generally include one or a handful (e.g., 2, 4, 8) of processing cores that may execute one or possibly two threads concurrently that arbitrate between front-end resources (e.g., dispatch units) to share back-end resources (e.g. execution pipelines). In contrast, graphics processing units (GPUs) implement a parallel processing architecture that enable each of a plurality of cores (e.g., 15 cores or streaming multiprocessors) to execute a large number of threads concurrently (e.g., 2048 threads per core). In other words, conventional trace tools may be capable of collecting, e.g., trace information for 2 threads per core, while trace tools for a GPU may be required to collect trace information for thousands of threads per core. In addition, the trace information (e.g., program counter location) for each of the threads may not be resident in a hardware program counter of the core during a given clock cycle. Instead, such trace information may be maintained by a scheduler unit associated with the core and loaded into a program counter when the thread is selected to issue an instruction to an associated dispatch unit. Thus, thread state in conventional GPUs may only be accessible during the clock cycle where an instruction for the thread is selected for issuance, thereby being loaded into the program counter and/or other control registers.

Importantly, most conventional parallel processing units are latency hiding architectures. This means that the processing units have small cache units, long access latencies, and do not include significant control logic or resources to support branch prediction and out-of-order execution. In order to hide long latency operations, the processing units allocates more space to multiple threads that can be switched with little overhead, thereby allowing long latency operations in one thread to be hidden by processing one of many available threads. In contrast, conventional CPU architectures only allocate system resources to a small number of threads and pay a large penalty for context switching between threads not loaded into the hardware.

In order to analyze a program, a programmer may collect stall reasons for the threads to help identify locations in the program associated with high latency or frequent stalls. It would be beneficial to determine whether the stall locations in a program consist of a small number of long stalls or a large number of short stalls. Existing collection methods, such as binary code instrumentation, can be used to count the number of total instructions executed at a particular program location and results may be combined with statistical sampling methods (e.g., sampling a program counter every 10,000 clock cycles) during analysis to produce more accurate results than could be achieved by using either method in isolation. Analysis may look at a stall count for a given program location as well as specifics of both current and past issued instructions in order to potentially determine a reason for a stall. For example, a program location associated with a high data dependency is likely to include an operand dependency on a previously issued instruction. A system utilized to analyze source code in this manner should include the ability to collect this stall information for a large number of threads executed by the parallel processing unit.

The present disclosure describes a system that includes transparent, hardware-based collection of trace information for a large number of threads, both active and inactive, being executed by a parallel processing unit. The parallel processing unit includes a plurality of cores, each core capable of executing thousands of threads in parallel. Each core may be partitioned, where each partition includes a micro-scheduler unit that manages the execution of a number of thread blocks or warps. A thread block or a warp is a plurality of related threads based on a single-instruction, multiple-thread (SIMT) architecture. In one embodiment, each thread block includes 32 threads executing the same instruction on different data. The SIMT architecture is similar to a SIMD architecture except that individual threads within the warp are allowed to diverge during execution (i.e., each thread block is associated with an active mask, where set bits in the active mask indicate which threads in the thread block execute the current instruction specified by the program counter). In one embodiment, the micro-scheduler unit may manage up to 16 thread blocks concurrently (e.g., 512 threads per core partition), arbitrating between the various thread blocks based on various scheduling algorithms.

Importantly, the micro-scheduler unit also ensures that any dependencies are resolved for each thread in the thread block prior to dispatching the next instruction for that thread block. Thus, the micro-scheduler tracks a status for each of the thread blocks managed by the micro-scheduler unit. The status may indicate whether the thread block is eligible to dispatch an instruction or stalled for a given clock cycle. If the thread block is stalled, then the status may indicate the type of stall for each warp. For example, an instruction from a thread block may be ready to issue but the micro-scheduler unit simply selected an instruction from a different thread block to issue during the current clock cycle based on the arbitration scheme; a thread block may be stalled waiting for a previous memory operation to load operand data for the instruction into a register; or the thread block may be stalled based on an L1 cache miss.

In one embodiment, each core implements at least one trace cell that includes logic for collecting trace information associated with each of the threads in the thread blocks managed by one or more micro-scheduler units included in the core. The trace cell may be configured to periodically collect trace information on each of the thread blocks managed by the micro-scheduler. The trace information for a particular thread block may include an identifier that indicates which core in the plurality of cores the thread block is allocated to, an address associated with a program counter for the thread block, and a stall vector (i.e., a vector that indicates a reason why the thread block is stalled). The trace cell may stream this information to a buffer (i.e., a FIFO) for temporary storage until the trace cell can write the trace information out to an event buffer in memory for later analysis. The trace information may be displayed to a programmer for the programmer to be able to analyze hotspots or bottlenecks in the source code. For example, NVIDIA® Nsight is a development platform for generating shader code in Microsoft® Visual Studio. Nsight includes a graphical user interface that may be configured to display trace information such that a programmer can analyze the source code based on execution of the compiled program on the parallel processing unit.

Figure 1A:
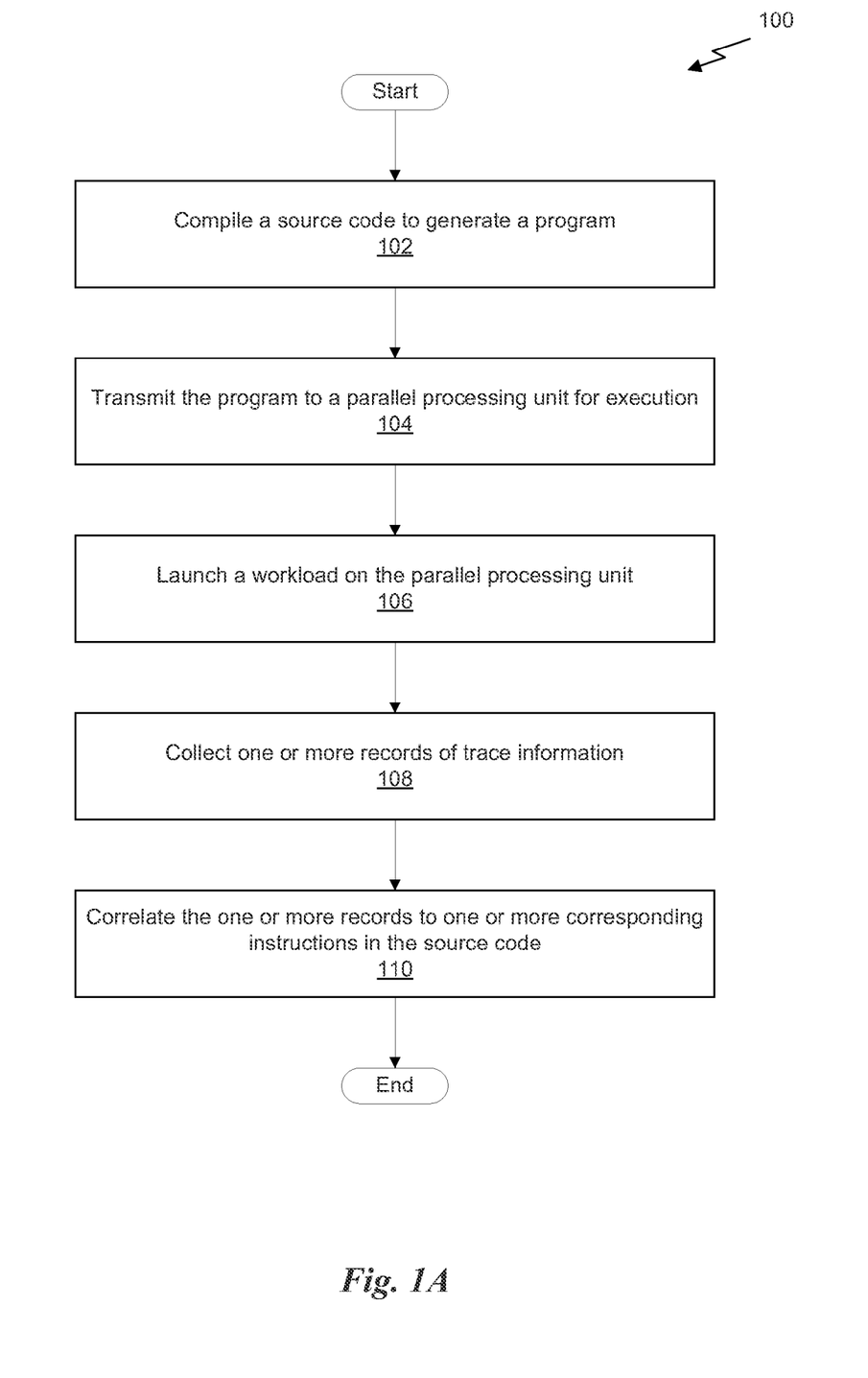
FIG. 1A illustrates a flowchart of a method for collecting trace information based on a graphics processing unit workload, according to one embodiment.

FIG. 1A illustrates a flowchart of a method 100 for collecting trace information based on a graphics processing unit workload, according to one embodiment. At step 102, a source code is compiled to generate a program. In the context of the present description, the program is a binary file including one or more instructions configured to be executed by a thread in a parallel processing unit. The program may be, e.g., a shader such as a vertex shader, geometry shader, or fragment shader (i.e., pixel shader). The source code may be a program written in a high-level programming language such as the High Level Shading Language (HLSL) or Compute Unified Device Architecture (CUDA) C/C++. At step 104, the program is transmitted to the parallel processing unit for execution. In one embodiment, the program may be copied from a system memory to a memory associated with the parallel processing unit (i.e., a graphics memory). The development platform may be configured to track a base address of the program in the memory such that the development platform can correlate a program counter address to a particular instruction in the program.

At step 106, a workload is launched on the parallel processing unit. The workload comprises one or more tasks to be executed by the parallel processing unit. At least one of the one or more tasks may execute a thread block configured to execute the instructions of the program. The workload may be a graphics workload meaning that the tasks are configured to generate image data for display or a compute workload meaning that the tasks are configured to perform general parallel processing operations in a manner consistent with General Purpose computing on a Graphics Processing Unit (GPGPU). In one embodiment, the programmer executes a graphics application on a host processing unit. The graphics application may include a program that is compiled to generate a binary executable file configured to be executed by a host processor coupled to the parallel processing unit. The graphics application may also generate a stream of Application Programming Interface (API) calls that are transmitted to a driver for the parallel processing unit. The stream of API calls is configured to cause the driver to launch the one or more tasks on the parallel processing unit. It will be appreciated that transmitting the program to the parallel processing unit for execution in step 104 may be implemented via one or more API calls that cause the driver to load the program into memory from which the GPU can execute the program.

At step 108, one or more records of trace information are collected by a tool. In one embodiment, the tool allocates an event buffer in the graphics memory for storing the one or more records generated by the parallel processing unit. The parallel processing unit is configured to generate the one or more records during execution of the program. At step 110, the one or more records are correlated to one or more corresponding instructions included in the source code. Each record is associated with a particular thread block and includes at least the value of the program counter associated with the thread block and a stall state for a thread. In the context of the present description, the stall vector includes a number of bits that represent a reason why the thread block is stalled. The stall vector may also indicate that a thread block is eligible if an instruction for the thread block is selected for dispatch during the current clock cycle. In one embodiment, the stall vector may include a number of bits where each bit corresponds to a particular stall reason. In another embodiment, the stall vector may encode the stall state in another manner, such as using a 4 or 6 bit value to encode an index to the highest priority stall reason.

When compared to conventional systems, the method 100 is not limited to collecting trace information from threads currently eligible for execution and instead can collect trace information from both eligible threads and stalled threads. These stall reasons are encoded into the trace information that is collected by the hardware of the parallel processing unit. The trace information is collected by the parallel processing unit in a manner that is transparent to the workload, as described by the method 150 of FIG. 1B.

Figure 1B:
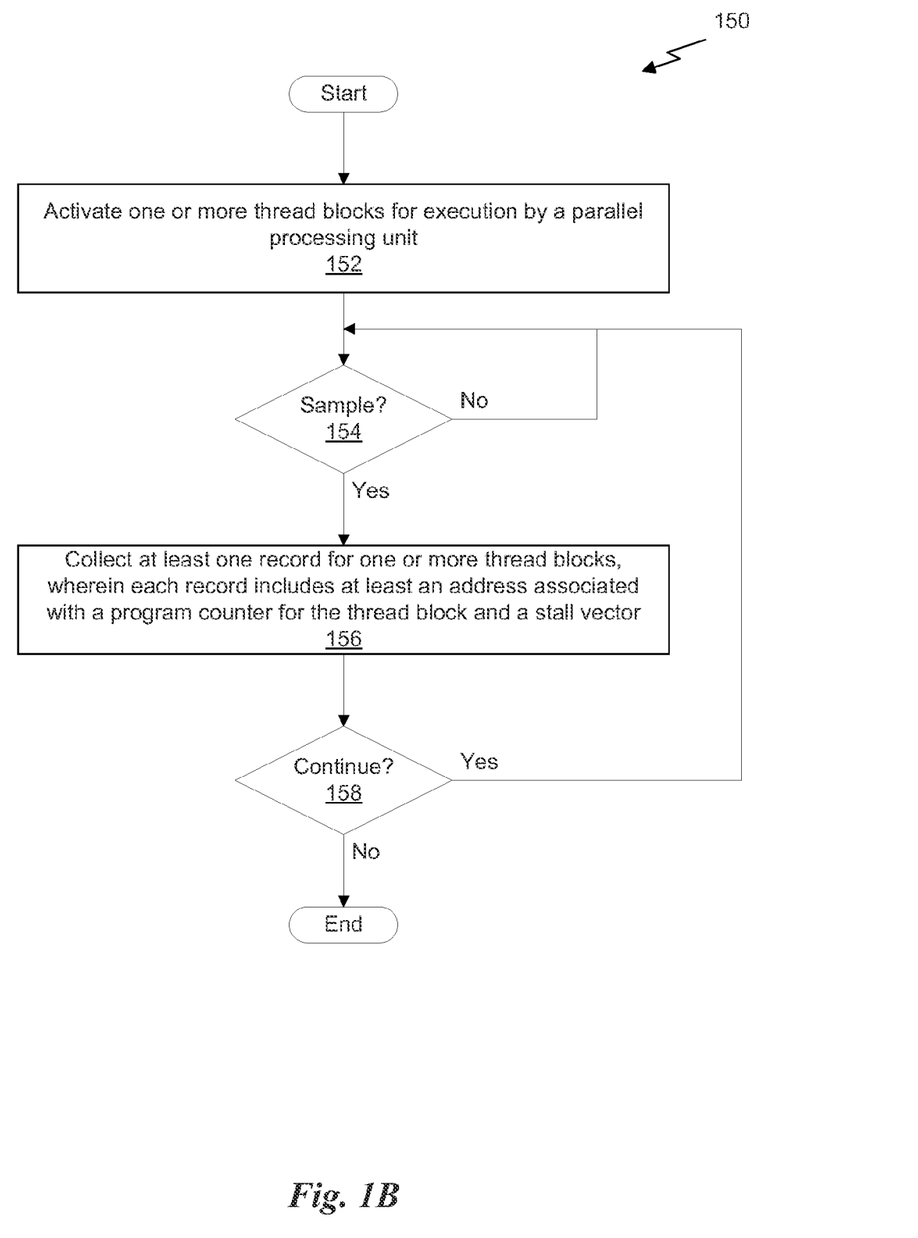
FIG. 1B illustrates a flowchart of a method for generating one or more records of trace information, according to one embodiment.

FIG. 1B illustrates a flowchart of a method 150 for generating one or more records of trace information, according to one embodiment. At step 152, one or more thread blocks are activated by a parallel processing unit for execution. Again, a driver may generate one or more tasks for execution on the parallel processing unit based on API calls generated by a graphics application. Each task may define one or more thread blocks to be executed by the plurality of cores of the parallel processing unit. The tasks are loaded into the graphics memory and an instruction is transmitted to the parallel processing unit to launch the execution of the tasks. In one embodiment, the thread blocks are assigned to an available core by a macro-scheduler (i.e., task management unit), and a micro-scheduler (i.e., scheduler unit) manages the execution of up to 16 thread blocks substantially simultaneously for a given partition of a core. Thus, a large number of thread blocks may be executed substantially simultaneously. In one embodiment, each micro-scheduler may issue up to two instructions per thread block during a given clock cycle.

At step 154, during each clock cycle, a determination is made as to whether to sample the trace information. In one embodiment, trace information is sampled at a particular sampling frequency every N clock cycles. A counter may be incremented based on a CLK signal and, when the counter reaches a threshold value, trace information is collected from the micro-scheduler and the counter is reset. In another embodiment, a counter may be incremented based on specific events such as function calls or cache misses. Thus, the trace information will be sampled every time a number of events occur. If a sample should not be collected during the current clock cycle, then the method returns to step 154 to wait for the next clock cycle. However, if a sample should be collected during the current clock cycle, then, at step 156, at least one record associated with one or more thread blocks is collected. The record for a particular thread block includes at least an address associated with a program counter for the thread block and a stall vector for the thread block. At step 158, the trace cell determines whether to continue collecting trace information for the thread blocks. If the trace cell should continue to collect trace information for the thread blocks, then the method returns to step 154 to wait for the next sample period. However, if the trace cell has completed collection of the trace information, then the method 150 terminates.

In one embodiment, the trace cell may be configured to generate a record for each thread block managed by the micro-scheduler during a given sampling period. For example, if a micro-scheduler manages 16 thread blocks concurrently, then the trace cell may generate 16 records during each sampling period, corresponding to stall information for 512 threads managed by the micro-scheduler. In one embodiment, such trace information may comprise 128 bytes of data, where each record is 8 bytes (e.g., a 4 byte program counter address, a 22-bit stall reason, a 4-bit processor identifier, and 6 reserved bits). In another embodiment, the trace information may comprise information such as a value associated with a program counter, a thread block identifier, a thread block stall vector, and one or more performance counter values. It will be appreciated that collecting this amount of data may require a large amount of bandwidth between the micro-scheduler and the trace cell. In another embodiment, the trace cell may be configured to generate a record for one of the thread blocks managed by the micro-scheduler during a given sampling period. For example, the trace cell may implement a counter that is incremented once per sampling period. The counter value may correspond to an index of one of the thread blocks managed by the micro-scheduler. During a particular sample period, the trace cell generates a record for only the particular thread block specified by the counter, and then the counter is incremented. In this manner, the trace cell generates records of trace information in a round-robin fashion, thereby reducing the bandwidth for trace information between the micro-scheduler and the trace cell. In other words, the trace cell will be configured to generate a single record for each thread block managed by the micro-scheduler during M sample periods, where M is equal to the number of thread blocks managed by the micro-scheduler.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
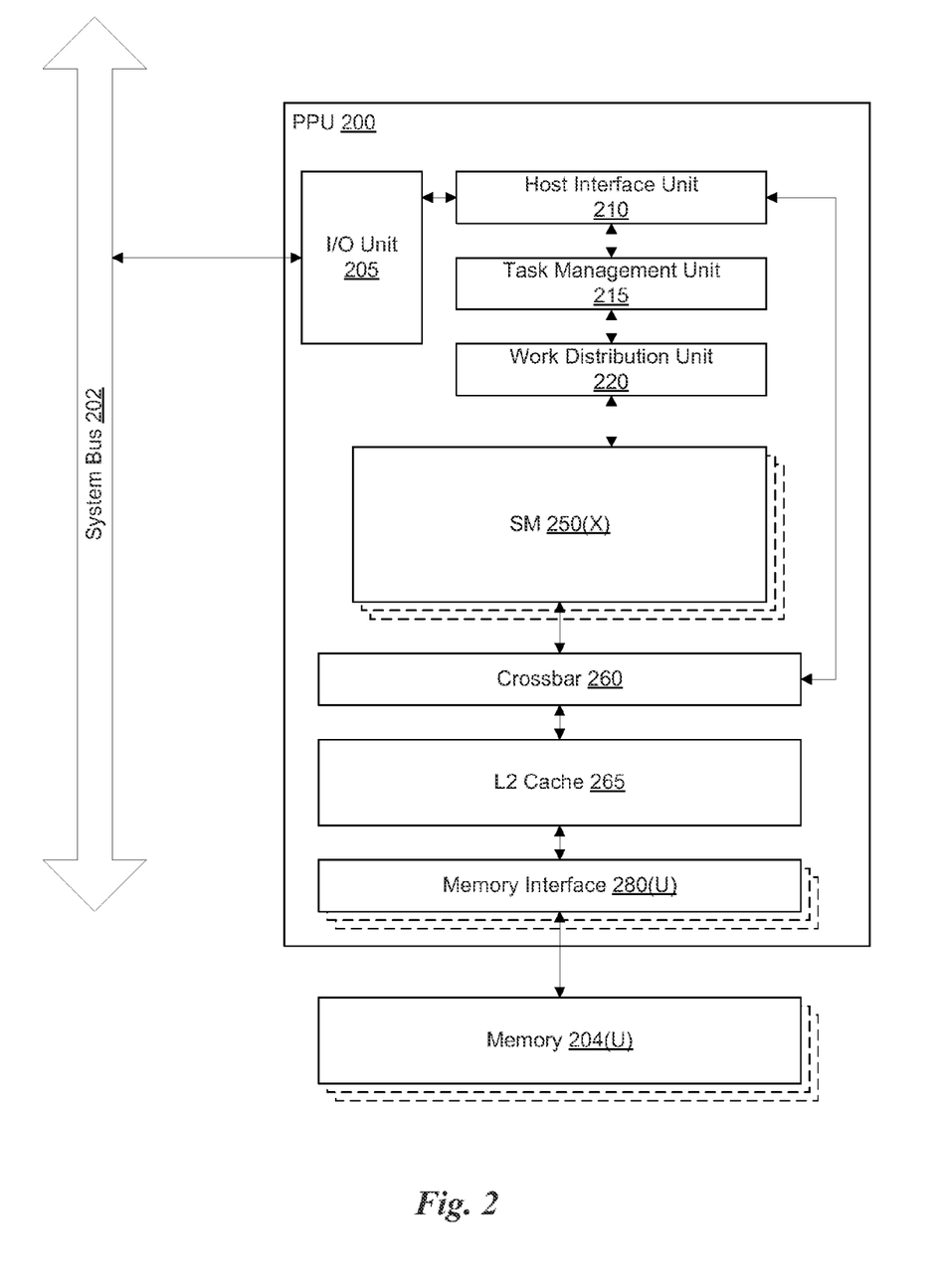
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200 Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shade, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
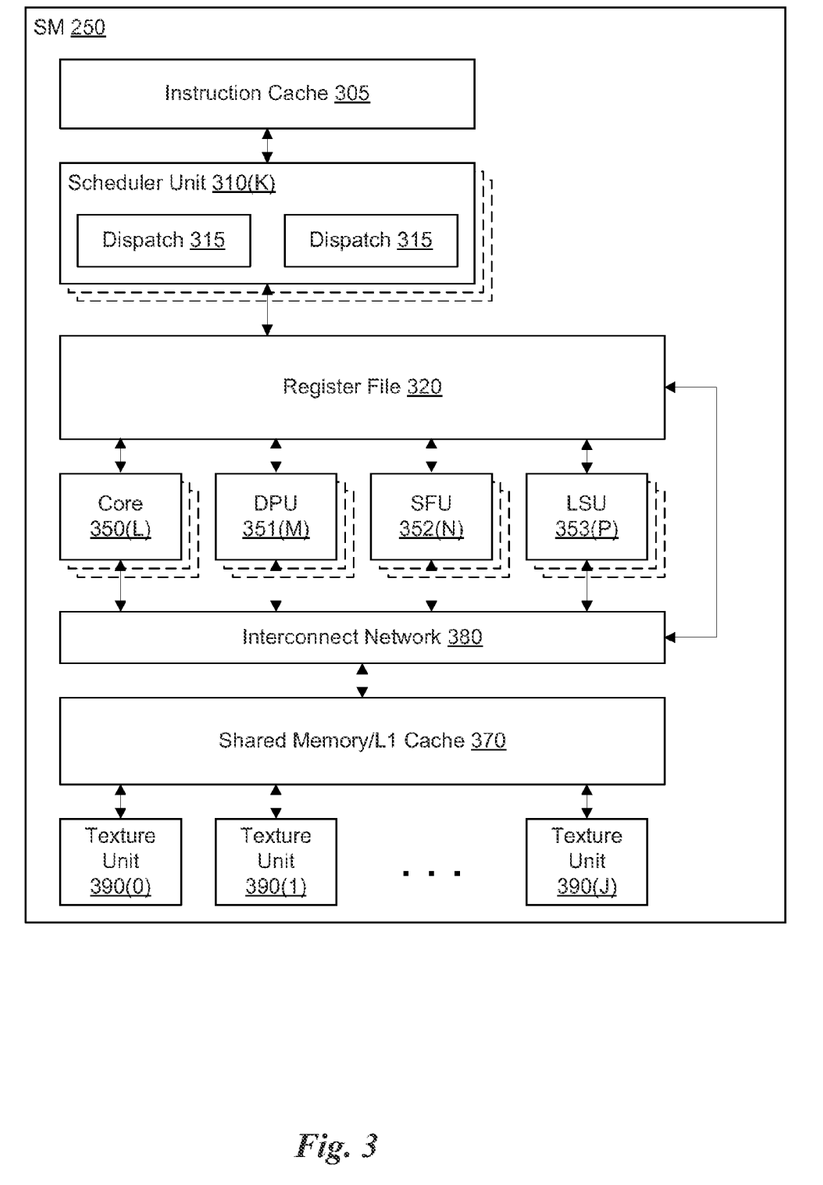
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 4 texture units 390.

The PPU 200 described above may be configured to perform highly parallel computations much faster than conventional CPUs. Parallel computing has advantages in graphics processing, data compression, biometrics, stream processing algorithms, and the like.

Figure 4:
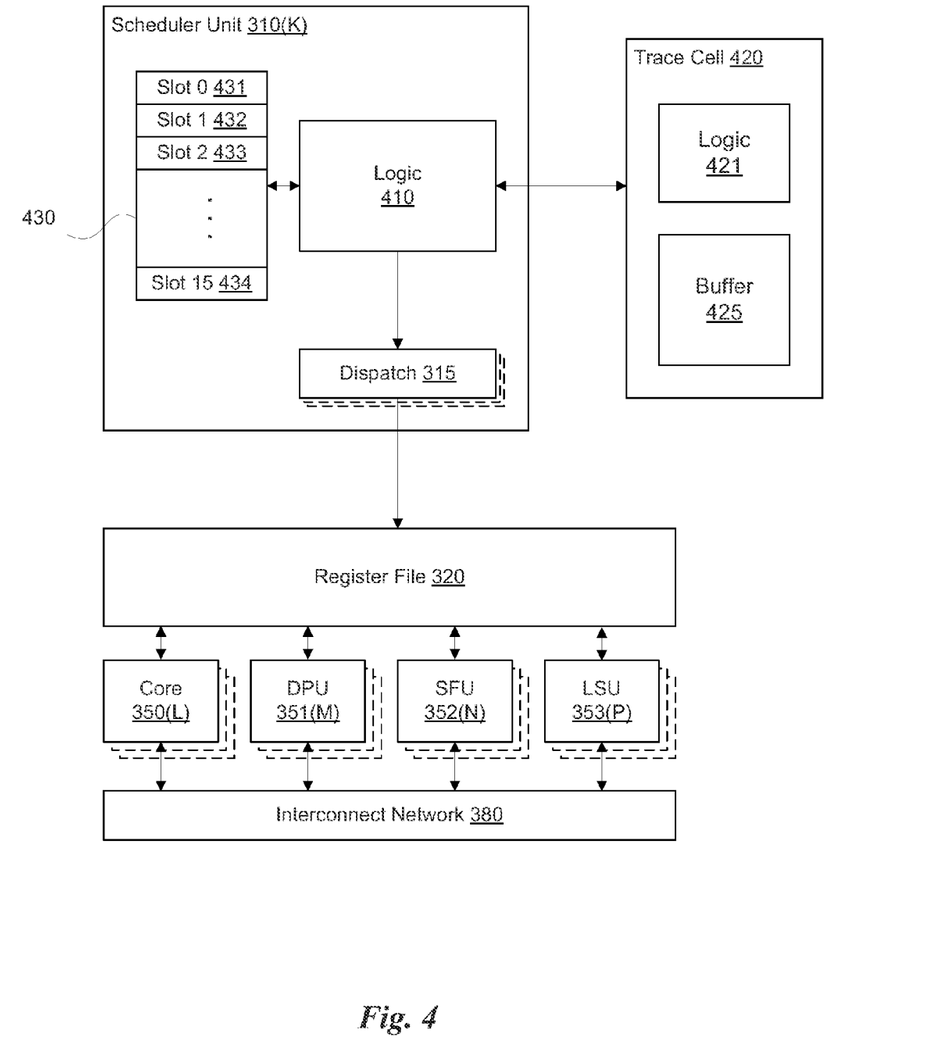
FIG. 4 illustrates a trace cell implemented within a partition of the SM of FIG. 3, in accordance with one embodiment.

FIG. 4 illustrates a trace cell 420 implemented within a partition of the SM 250 of FIG. 3, in accordance with one embodiment. In the context of the present description, a partition of the SM 250 comprises the back-end resources allocated to a particular scheduler unit 310. It will be appreciated that partitions may have access to shared resources within the SM 250 such as the shared memory/L1 cache 370 that are accessible by two or more partitions of the SM 250. As shown in FIG. 4, a single trace cell 420 may be implemented for each partition in the SM 250. However, in other embodiments, a single trace cell 420 may be implemented per SM 250 and be coupled to two or more scheduler units 310 in multiple partitions of the SM 250. In yet another embodiment, the functionality of the trace cell 420 may be implemented entirely within the scheduler unit 310 such that there is no trace cell 420 included in the SM 250 as a separate and distinct unit from the scheduler unit 310.

The trace cell 420 is a hardware unit that determines when trace information should be sampled from the scheduler unit 310 and initiates operations to store the trace information in the memory 204. As shown in FIG. 4, the trace cell 420 includes logic 421 and a buffer 425. The logic 421 may include circuit elements such as logic gates, registers, counters, and other types of circuit elements required to determine when to sample trace information from the scheduler unit 310. In one embodiment, the logic 421 includes a counter that is incremented by a CLK signal. The value of the counter is compared to a programmable register that can be set via an instruction executed by the host processor in order to adjust the sampling frequency of the trace cell 420. For example, the host processor may use memory mapped input/output to write to a specific memory address in the memory 204. The PPU 200 monitors the memory bus and copies the data written by the host processor into a special register in the PPU 200. In another embodiment, the logic 421 may include a counter configured to be incremented when one or more events occur. When an event occurs, a special register may be set, thereby incrementing the counter in the logic 421. The value of the counter is compared to a programmable register that can be set via an instruction in order to adjust the sampling frequency of the trace cell 420 based on the occurrence of certain events such as cache misses, branch instructions, and so forth.

In addition to allowing a programmer or driver to change the sampling frequency of the trace cell 420, the trace cell(s) 420 may be programmed to collect trace information from one to many SMs 250 based on a core identifier for each SM 250, collect trace information from one to many thread blocks based on a thread block identifier for each thread block, collect trace information for a specific workload (i.e., task) based on a task identifier, or collect trace information within a particular time range for multiple workloads. In other words, the logic 421 may include registers for indicating whether the trace cell 420 should be enabled for a particular SM 250 (such as by using a 16-bit vector to indicate which SMs 250 should activate trace information collection), registers for indicating whether the trace cell 420 should collect data for any particular thread block(s) resident on the SM 250, registers for specifying a start time and an end time that indicate a range for collecting trace information based on a system clock or based on an elapsed time since the start of execution of a workload, and so forth.

The buffer 425 may be a first-in, first-out (FIFO) that is sized to store one or more records of trace information collected from the scheduler unit 310 by the trace cell 420. In one embodiment, the buffer 425 may be sized to store up to 16 records collected from the scheduler unit 310. Although not shown explicitly, the trace cell 420 may be connected to the interconnect network 380, the shared memory/L1 cache 370, and/or the register file 320 such that the records in the buffer 425 may be written out to the memory 204 or to an auxiliary interconnect such that streaming of the data to the memory is transparent to the SM 250 when trying to access the interconnect network 380.

As also shown in FIG. 4, the scheduler unit 310 may include logic 410 for selecting which thread block(s) to select for issuing an instruction during the current clock cycle and a thread state table 430 that includes a number of slots (e.g., slot 0 431, slot 1 432, etc.) for storing thread state information. As the scheduler unit 310 receives a thread block for execution from the work distribution unit 220, the scheduler unit 310 may store thread state information associated with the thread block in the thread state table 430. The thread state information may be loaded from memory 204 by the scheduler unit MO after the scheduler unit MO receives a pointer to the thread state information from the work distribution unit 220, or the scheduler unit 310 may receive the thread state information directly from the work distribution unit 220, or a combination of both. In one embodiment, the thread state table 430 includes 16 slots, one slot for each of the 16 potential thread blocks that may be managed by the scheduler unit 310 concurrently.

In one embodiment, the thread state information includes an identifier corresponding to the thread block, a stall vector that indicates whether the thread block is stalled and for what particular reason, an address associated with the program counter for the thread block indicating the next instruction to be issued for the thread block, and any other information necessary for managing the scheduling of instructions associated with the thread block. For example, for a scheduler unit 310 that implements priority-based scheduling, the thread state information may include a thread priority value (e.g., between 0 and 31) that is used by the scheduling algorithm to determine which thread block to issue during the next clock cycle.

The thread state information may indicate a status of each thread block managed by the scheduler unit 310 including indicating whether each thread block is active (i.e., an instruction for the thread block is dispatched during the current clock cycle) or inactive and, if the thread block is inactive, a stall vector that encodes a reason why the thread block is inactive. Stall reasons may include, but are not limited to, that the thread block is waiting on a dependency barrier (e.g., waiting for a memory request to be fulfilled, waiting for synchronization between thread blocks, etc.), that the thread block was ready to issue but wasn't selected to issue that clock cycle, that the dispatch unit is stalled (i.e., there are no available resources to execute the particular instruction), that the instruction is waiting for a texture or memory value to be generated by the texture unit, and the like.

In one embodiment, a programmer may perform an analysis of source code that is compiled and executed by the PPU 200. The programmer may run a development platform such as NVIDIA® Nsight for Visual Studio on a host computer. The development platform or driver may compile the source code to generate a program, store the program in the memory 204, and execute the program via the PPU 200 based on API calls generated by a graphics application. Prior to executing the program on the PPU 200, the graphics application may be configured to setup the PPU 200 to collect various execution statistics using the trace cell 420 implemented in the PPU 200. For example, an API call generated by the graphics application may cause the driver to transmit an instruction to the PPU 200 that sets a value in a register to enable trace information collection. Another register (or the same register) may be set that configures the sampling frequency of the trace cell 420. Then, during execution of the program, the trace cell 420 collects records containing trace information from the scheduler unit 310, temporarily storing the records in the buffer 425, before writing the trace information out to an event buffer in memory 204 or a main system memory associated with the host processor. The programmer may view this trace information using a graphical user interface (GUI) associated with the development platform in order to debug the source code the programmer is analyzing.

In one embodiment, the application is configured to utilize a replay mechanism implemented by the driver and/or an application shim coupled between the driver and the application. The replay mechanism stores an initial state of the PPU 200 at the beginning of an API stream configured to launch a workload on the PPU 200, captures an API stream generated by the application, and then transmits the captured API stream to the PPU 200 for execution one or more times, restoring the initial state of the PPU 200 between each iteration of the captured API stream. The replay mechanism enables a larger sample size of execution statistics to be captured for the source code by executing the program multiple times such that the execution statistics are more accurate.

In one embodiment, the trace information collected from the scheduler unit 310 includes a thread block identifier, a program counter address, and a stall vector that represents one or more reasons why a thread is stalled. The trace information may also include timing information such as an index of the clock cycle when the trace information was collected. In one embodiment, the development platform may correlate the trace information with specific lines in the source code. In order to perform the correlation, the development platform may generate a table that maps instructions in the compiled program to the instructions in the source code. In other words, the assembly level instructions may be correlated to specific program line numbers in either the source code or an intermediate representation (e.g., PTX) of the source code generated by the driver during one or more compilation passes. Thus, when the development platform displays a graphical representation of the trace information to the programmer, the programmer can easily correlate a particular record of trace information with a line in the source code, either at the assembly level, at the intermediate representation level, or at the high-level programming level of the original source code (e.g., in HLSL, CUDA C, or the like).

In one embodiment, the development platform may also perform an analysis of the trace information to correlate the stall reason for a particular thread block with a particular instruction in one or more other thread blocks. In other words, the development environment can analyze the timing for when the thread block was stalled and when the thread block was no longer stalled and attempt to isolate the instruction that either caused or corrected the stall for the particular thread block. For example, if a particular thread block was stalled waiting for a texture operation, the development platform can potentially isolate which texture instruction caused that particular thread block to stall. Therefore, the programmer can isolate not only where a bottleneck or hotspot is located in the program, but what instructions are potentially causing the bottleneck or hotspot.

In some conventional graphics processors, a performance monitor that tracks performance statistics for the various SMs 250 of the PPU 200 may be implemented. The performance monitor may include various performance monitor (PM) counters that track, among other statistics, how many clock cycles a particular SM 250 was active or inactive during a given GPU context, a number of tasks or threads launched by a particular SM 250, and so forth. In these systems, the performance monitor may implement a streaming interface to transmit the performance monitor statistics to memory for analysis. In one embodiment, the functionality of the trace cell 420 described above may be implemented in the existing performance monitor unit and the streaming interface may be utilized to write the trace information out to the memory 204. In addition, the trace information may include sample values from one or more of the existing PM counters.

Figure 5A:
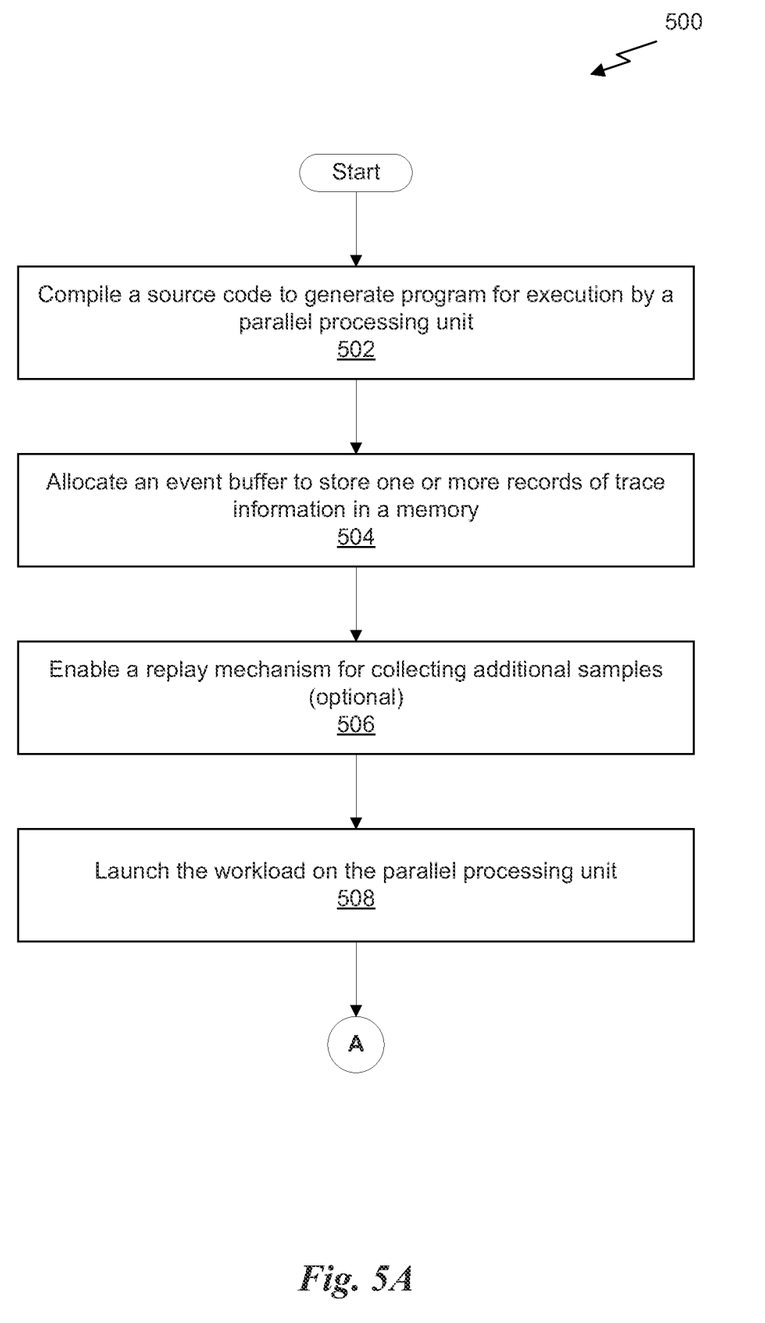
FIGS. 5A & 5B illustrate a flowchart of a method for collecting trace information for graphics processing unit tasks, according to another embodiment.
Figure 5B:
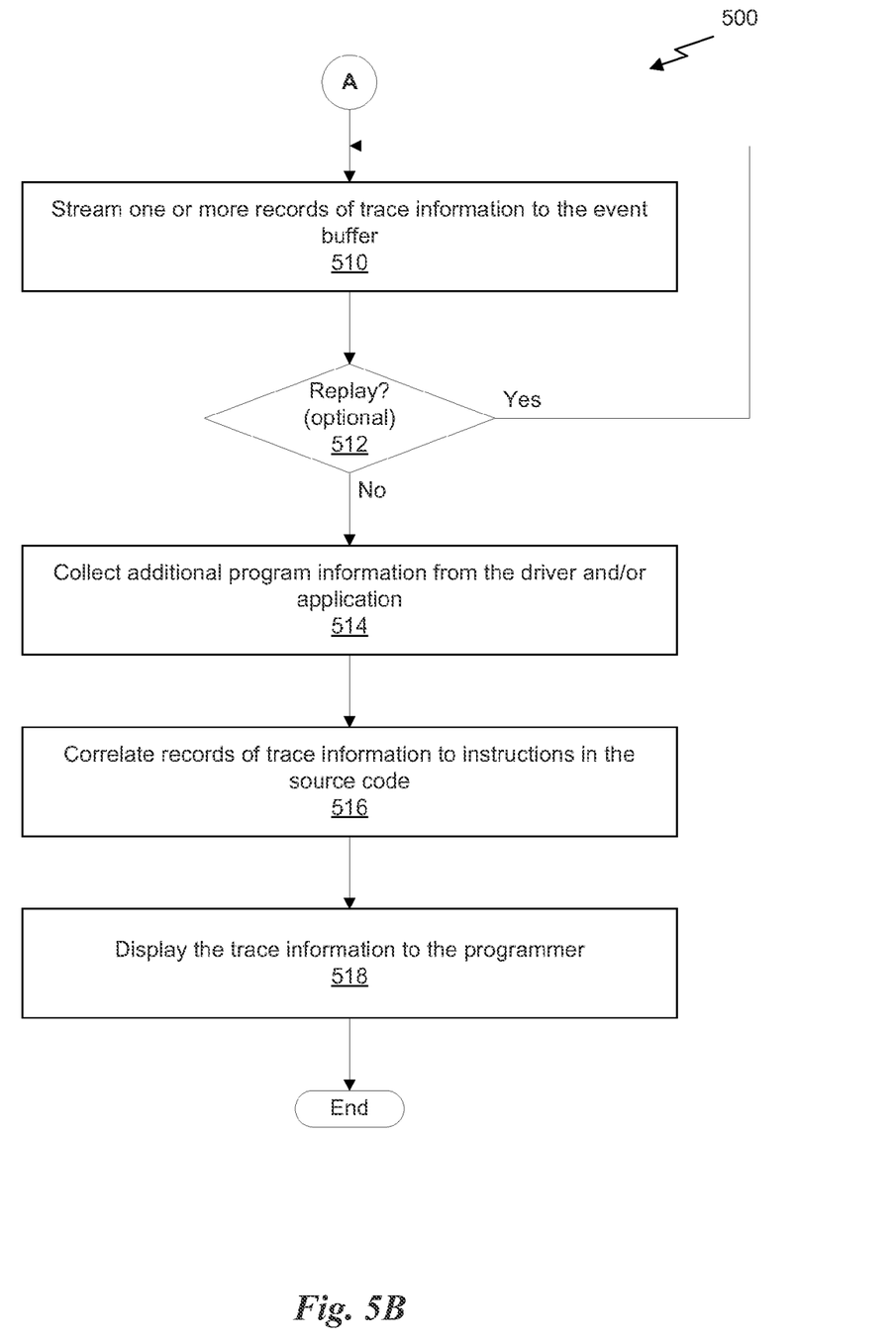

FIGS. 5A & 5B illustrate a flowchart of a method 500 for collecting trace information for graphics processing unit tasks, according to another embodiment. At step 502, a source code is compiled to generate a program for execution by the PPU 200. In one embodiment, a driver compiles the source code, translating the high-level instructions into an intermediate representation before compiling the intermediate representation into a binary version of the source code (i.e., program) for execution by the PPU 200. The driver may be configured to generate line table information that maps particular instructions in the binary version of the source code with particular instructions in the high-level source code. At step 504, a development platform or a driver allocates an event buffer to store one or more records of trace information in memory 204. A pointer to the event buffer may be transmitted to the trace cell 420 to enable records to be written from the buffer 425 to the event buffer. At step 506, the application enables a replay mechanism in the driver (or application shim) to enable a sufficient number of samples to be collected during execution of the program. It will be appreciated that step 506 is optional and may be excluded from method 500. At step 508, the application launches the workload on the PPU 200.

At step 510, one or more records of trace information are streamed to the event buffer. In one embodiment, trace information is collected by the trace cell 420 and then written to the event buffer via the LSUs 353 of the SM 250. In another embodiment, trace information may be collected and written to the event buffer using an existing streaming capability of the performance monitor. At step 512, the development platform determines whether the replay mechanism should be utilized to collect additional samples. If the development platform determines that iteration is necessary to collect additional samples, then the development platform initiates the replay mechanism and the method 500 returns to step 510 to collect additional trace information. However, if the development platform determines that iteration is not needed, then, at step 514, the development platform collects additional program information from the driver, graphics application, or the development platform including source code, debug information, and program relocation information (i.e., a table that maps a base address of the program to a location of the program in the memory 204). At step 516, the application correlates records of trace information to particular instructions in the source code. The records may be correlated to instructions in the assembly code, intermediate representation of the source code, or the high-level source code. At step 518, the development platform displays the trace information to the programmer. In one embodiment, a graphical representation of the trace information is generated and displayed via the GUI implemented by the application.

Figure 6:
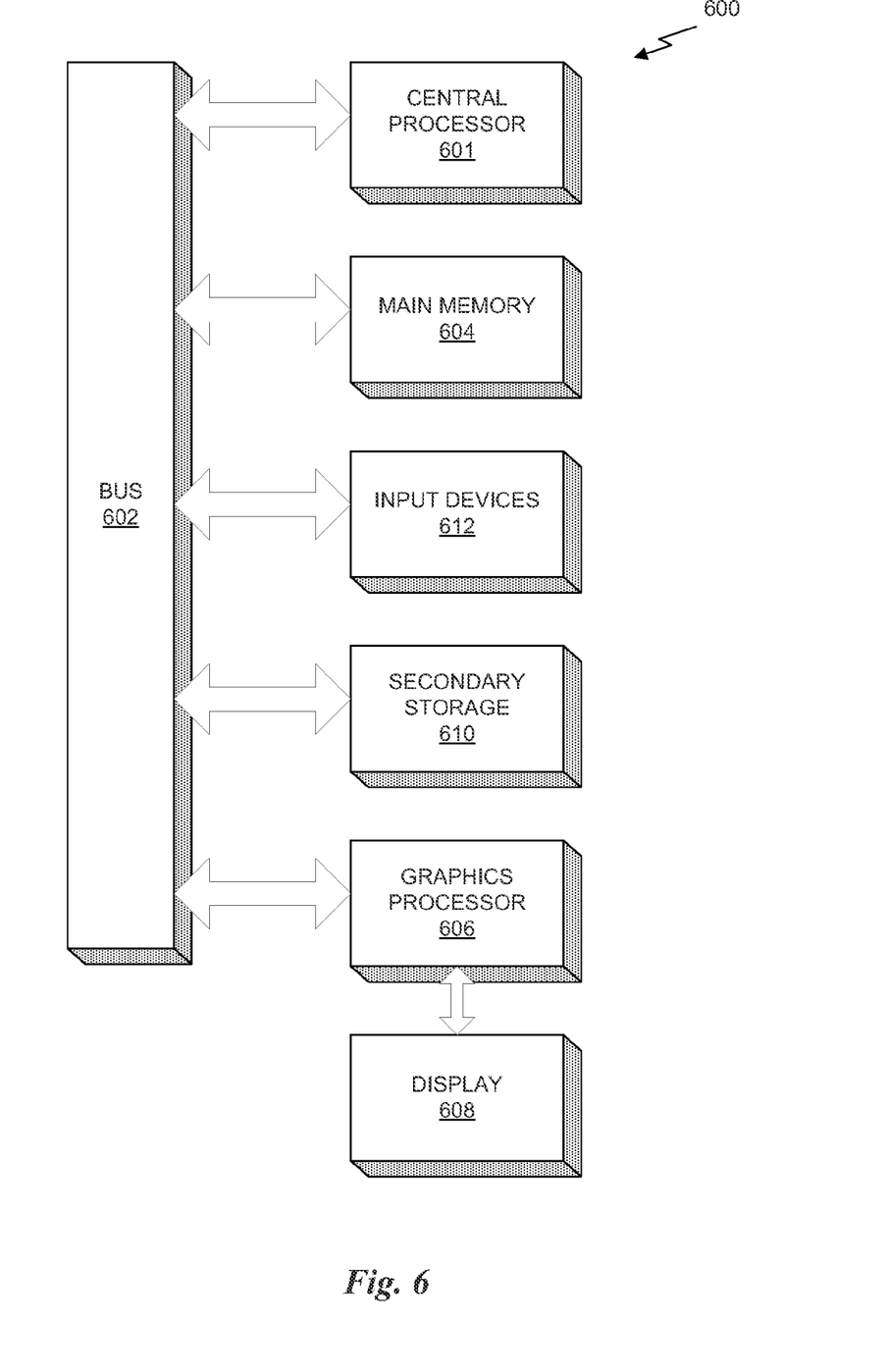
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    compiling source code to generate a program;
    launching a workload to be executed by a parallel processing unit, wherein the workload includes one or more tasks to be executed by the parallel processing unit, and at least one task of the one or more tasks executes a thread block configured to execute the program;
    collecting one or more records of trace information associated with a plurality of threads configured to execute the program; and
    correlating the one or more records to one or more corresponding instructions included in the source code, wherein each record in the one or more records includes a value of a program counter, a thread block identifier, and a scheduler state that comprises a stall vector having at least two bits, each bit in the at least two bits representing a different reason for a thread block to be stalled.

2. The method of claim 1, wherein each record is associated with a thread block comprising a plurality of related threads in a single-instruction, multiple-thread (SIMT) architecture.

3. The method of claim 1, further comprising allocating an event buffer in a memory to store the one or more records.

4. The method of claim 1, further comprising enabling a replay mechanism prior to launching the workload.

5. The method of claim 4, further comprising:
    determining that the workload should be executed one or more additional times to generate additional records; and
    replaying an Application Programming Interface (API) stream captured by the replay mechanism in order to re-launch the workload on the parallel processing unit.

6. The method of claim 1, further comprising generating a table that associates each instruction in the program with a corresponding instruction in the source code.

7. The method of claim 6, wherein correlating the one or more records to the one or more corresponding instructions included in the source code comprises:
    mapping the value in the record to a corresponding instruction in the program; and
    looking up the corresponding instruction in the table to determine an associated instruction in the source code.

8. The method of claim 7, wherein mapping the value in the record to the corresponding instruction in the program comprises determining an offset between the value and a base address of a location where the program is stored in a memory.

9. The method of claim 1, wherein the one or more records are generated by a trace cell coupled to a scheduler unit configured to maintain thread state information for a plurality of thread blocks.

10. The method of claim 9, wherein the trace cell comprises a buffer configured to temporarily store one or more records and logic for collecting trace information from the scheduler unit.

11. The method of claim 9, wherein the trace cell may be programmed to sample trace information at variable frequencies.

12. The method of claim 9, wherein the trace cell may be programmed to sample trace information based on one or more events.

13. The method of claim 12, wherein the one or more events comprise at least one of a cache miss, a function call, and execution of a branch instruction.

14. A non-transitory computer-readable storage medium storing instructions that, when executed by a processor, cause the processor to perform steps comprising:
    compiling source code to generate a program;
    launching a workload to be executed by the parallel processing unit, wherein the workload includes one or more tasks to be executed by the parallel processing unit, and at least one task of the one or more tasks executes a thread block configured to execute the program;

collecting one or more records of trace information associated with a plurality of threads configured to execute the program; and correlating the one or more records to one or more corresponding instructions included in the source code, wherein each record in the one or more records includes a value of a program counter, a thread block identifier, and a scheduler state that comprises a stall vector having at least two bits, each bit in the at least two bits representing a different reason for a thread block to be stalled.

15. The non-transitory computer-readable storage medium of claim 14, wherein each record is associated with a thread block comprising a plurality of related threads in a single-instruction, multiple-thread (SIMT) architecture.

16. A system comprising:
a hardware parallel processing unit;
a scheduler unit configured to manage execution of a plurality of thread blocks; and
a trace cell configured to generate one or more records of trace information associated with the plurality of thread blocks,
wherein each record in the one or more records includes a value of a program counter, a thread block identifier, and a scheduler state that comprises a stall vector having at least two bits, each bit in the at least two bits representing a different reason for a thread block to be stalled.

17. The system of claim 16, the system further comprising a host processor configured to execute a development platform configured to:
compile a source code to generate a program;
transmit the program to the parallel processing unit;
launch a workload to be executed by the parallel processing unit, wherein the workload includes one or more tasks to be executed by the parallel processing unit, and at least one task of the one or more tasks executes a thread block configured to execute the program;
collect the one or more records; and
correlate the one or more records to one or more corresponding instructions included in the source code.

18. The system of claim 17, wherein each record is associated with a thread block comprising a plurality of related threads in a single-instruction, multiple-thread (SIMT) architecture.

19. The system of claim 17, further comprising a driver configured to generate a table that associates each instruction in the program with a corresponding instruction in the source code.

* * * * *